US008680230B2

(12) United States Patent  
Konno et al.

(10) Patent No.: US 8,680,230 B2  
(45) Date of Patent: Mar. 25, 2014

(54) PRODUCTION PROCESS OF POLY(ARYLENE SULFIDE) WHOSE CONTENT OF TERMINAL HALOGEN GROUP HAS BEEN REDUCED

(75) Inventors: Akihiro Konno, Tokyo (JP); Ken-ichi Takaki, Tokyo (JP); Hiroshi Sakabe, Tokyo (JP)

(73) Assignee: Kureha Corporation, Tokyo (JP)

( * ) Notice: Subject to any disclaimer, the term of this patent is extended or adjusted under 35 U.S.C. 154(b) by 377 days.

(21) Appl. No.: 13/055,430

(22) PCT Filed: Jun. 10, 2009

(86) PCT No.: PCT/JP2009/060598  
§ 371 (c)(1),  
(2), (4) Date: Jan. 21, 2011

(87) PCT Pub. No.: WO2010/010760  
PCT Pub. Date: Jan. 28, 2010

(65) Prior Publication Data  
US 2011/0124825 A1 May 26, 2011

(30) Foreign Application Priority Data

Jul. 22, 2008 (JP) ................................ 2008-188057

(51) Int. Cl.  
*C08G 75/14* (2006.01)

(52) U.S. Cl.  
USPC ........... 528/389; 528/388; 528/499; 528/488; 525/537

(58) Field of Classification Search  
USPC ........... 525/537; 528/388, 389, 488, 489, 499  
See application file for complete search history.

(56) References Cited

U.S. PATENT DOCUMENTS

| 3,919,177 A | 11/1975 | Campbell |
| 4,016,145 A | 4/1977 | Campbell |
| 4,038,263 A | 7/1977 | Edmonds, Jr. et al. |
| 4,507,468 A | 3/1985 | Kawabata |
| 4,645,826 A | 2/1987 | Iizuka et al. |
| 4,820,800 A * | 4/1989 | Geibel et al. .................. 528/388 |
| 4,820,801 A | 4/1989 | Inoue |
| 5,151,495 A | 9/1992 | Inoue et al. |
| 5,384,391 A | 1/1995 | Miyata et al. |
| 2006/0084785 A1 | 4/2006 | Sato et al. |
| 2007/0265425 A1 * | 11/2007 | Suzuki et al. ................. 528/388 |

FOREIGN PATENT DOCUMENTS

| EP | 166368 A2 | 1/1986 |
| EP | 225471 A1 | 6/1987 |
| EP | 323723 A2 | 7/1989 |
| EP | 527055 A2 | 2/1993 |
| EP | 1577336 A1 | 9/2005 |
| JP | 52-12240 | 5/1977 |
| JP | 55-156342 | 12/1980 |
| JP | 59-219331 | 12/1984 |
| JP | 59-219332 | 12/1984 |
| JP | 63-33775 | 1/1986 |
| JP | 5-11128 | 3/1987 |
| JP | 62-106929 | 5/1987 |
| JP | 1-161022 | 6/1989 |
| JP | 5-163349 | 6/1993 |
| JP | 7-10997 | 1/1995 |
| JP | 2000-191785 | 7/2000 |
| JP | 2002-293936 | 10/2002 |
| JP | 2003-176357 | 6/2003 |
| WO | 2004/060972 A1 | 7/2004 |

* cited by examiner

*Primary Examiner* — Shane Fang  
(74) *Attorney, Agent, or Firm* — Porter Wright Morris & Arthur LLP

(57) ABSTRACT

The invention provides a production process of a poly(arylene sulfide) which contains a step of polymerizing a sulfur source and a dihalo-aromatic compound in an organic amide solvent, said polymerization step containing a phase-separation polymerization step that the polymerization reaction is continued in the presence of a phase separation agent in a phase-separated state, wherein a monohalo-organic compound is added in a proportion of 0.005 to 20 mol per 100 mol of the charged sulfur source into the polymerization reaction system at the time a conversion of the dihalo-aromatic compound has reached 80 to 99% after initiation of the polymerization reaction and before the liquid phase becomes the phase-separated state to be reacted with a formed polymer, and the liquid phase within the polymerization reaction system is then converted to the phase-separated state to continue the polymerization reaction.

12 Claims, No Drawings

PRODUCTION PROCESS OF POLY(ARYLENE SULFIDE) WHOSE CONTENT OF TERMINAL HALOGEN GROUP HAS BEEN REDUCED

TECHNICAL FIELD

The present invention relates to a production process of a poly(arylene sulfide) whose content of a terminal halogen group has been markedly reduced. More particularly, the present invention relates to a process for producing a poly(arylene sulfide) by polymerizing a sulfur source and a dihalo-aromatic compound in an organic amide solvent according to a polymerization process comprising a phase-separation polymerization step, by which a granular poly(arylene sulfide) whose content of a terminal halogen group has been markedly reduced can be efficiently obtained while retaining a yield, a melt viscosity, a molecular weight, etc. at a high level.

BACKGROUND ART

Poly(arylene sulfides) (hereinafter abbreviated as "PASs") represented by poly(phenylene sulfide) (hereinafter abbreviated as "PPS") are engineering plastics excellent in heat resistance, chemical resistance, flame retardancy, mechanical strength, electrical properties, dimensional stability, etc. The PASs are commonly used in a wide variety of fields such as electrical and electronic equipments and automotive equipments because they can be molded or formed into various kinds of molded or formed products, films, sheets, fibers, etc. by general melt processing processes such as extrusion, injection molding and compression molding.

As a typical production process of a PAS, is known a process in which a sulfur source is reacted with a dihalo-aromatic compound in an organic amide solvent such as N-methyl-2-pyrrolidone. As the sulfur source, is generally used an alkali metal sulfide, an alkali metal hydrosulfide or a mixture thereof. When the alkali metal hydrosulfide is used as the sulfur source, the alkali metal hydrosulfide is used in combination with an alkali metal hydroxide.

When at least one sulfur source selected from the group consisting of alkali metal sulfides and alkali metal hydrosulfides is reacted with a dihalo-aromatic compound, a great amount of an alkali metal salt such as NaCl is secondarily produced by a desalting condensation reaction. The alkali metal salt adversely affects the electrical properties of the resulting PAS because the salt is an electrolytic component. The PAS is used as, for example, a sealing compound or covering material for electronic parts. When the PAS containing the alkali metal salt is used in these applications, the alkali metal salt corrodes electrodes or wiring of the electronic part, causes disconnection or makes a leakage current great.

There have heretofore been proposed various methods for reducing the content of the alkali metal salt contained in the PAS. For example, Japanese Patent Application Laid-Open No. 55-156342 (Patent Literature 1) proposes a method for extracting PPS powder with heated deionized water over a long period of time. However, the extraction method with the heated water involves a problem that an extraction efficiency of the alkali metal salt is low in addition to the fact that it takes a long time for the extraction.

Japanese Patent Application Laid-Open No. 59-219331 (Patent Literature 2) proposes a method for reducing the content of an alkali metal salt by subjecting PPS to a heat treatment in an aromatic solvent. However, this method requires to conduct the heat treatment of the PPS after polymerization in the aromatic solvent such as diphenyl ether for a long period of time.

In addition, the methods proposed by these Patent Literatures 1 and 2 intend to remove alkali metal salts such as NaCl secondarily produced and cannot reduce the content of a halogen atom such as a chlorine atom bonded to a terminal. More specifically, when a sulfur source is reacted with a dihalo-aromatic compound, a PAS with a halogen atom such as a chlorine atom bonded to a terminal of its polymer chain is formed in addition to the fact that a great amount of an alkali metal salt such as NaCl is secondarily produced by a desalting condensation reaction.

As a method for reducing the content of the bonded chlorine, Japanese Patent Application Laid-Open No. 62-106929 (Patent Literature 3) proposes a method in which PPS is subjected to a heat treatment with a mercapto group-containing compound or an alkali metal salt thereof in a solvent capable of dissolving the PPS. However, this method is not efficient because the PPS is caused to react with the particular reaction reagent at a high temperature over a long period of time after the PPS is washed in a post treatment step after polymerization, and filtering and washing steps are further required.

Japanese Patent Application Laid-Open No. 5-163349 (Patent Literature 4) proposes a process for producing a PAS having a low bonded chlorine content by subjecting a cyclic arylene sulfide oligomer to ring-opening polymerization under heating in the presence of a ring-opening polymerization catalyst. However, this method requires to extract a 7- to 15-mer cyclic phenylene sulfide oligomer from a PPS formed after a polymerization reaction of sodium sulfide with p-dichloro-benzene in an organic amide solvent by Soxhlet extraction using methylene chloride as a solvent. Therefore, it is difficult to apply this method to production on an industrial scale.

On the other hand, there have been proposed various processes for producing a high-molecular weight PAS using various polymerization aids in a production process of a PAS by polymerizing a sulfur source and a dihalo-aromatic compound in an organic amide solvent. For example, Japanese Patent Publication No. 52-12240 (Patent Literature 5) discloses a production process of PPS using a carboxylic acid alkali metal salt as the polymerization aid. Japanese Patent Application Laid-Open No. 59-219332 (Patent Literature 6) discloses a production process of PPS using an alkaline earth metal salt or zinc salt of an aromatic carboxylic acid as the polymerization aid. U.S. Pat. No. 4,038,263 (Patent Literature 7) discloses a production process of PPS using an alkali metal halide as the polymerization aid. Japanese Patent Application Laid-Open No. 1-161022 (Patent Literature 8) discloses a production process of PPS using the sodium salt of an aliphatic carboxylic acid as the polymerization aid. Japanese Patent Publication No. 63-33775 (Patent Literature 9) discloses a production process of a PAS using water as the polymerization aid.

The amount and time of these polymerization aids added, the temperature of a polymerization reaction system, etc. are controlled, whereby a phase-separated state that a concentrated formed polymer phase and a dilute formed polymer phase are present in a mixed state can be created in a liquid phase within the polymerization reaction system. When the polymerization reaction is continued in such a phase-separated state, the formation of a high-molecular weight PAS is caused to progress, and moreover the high-molecular weight PAS can be obtained in the form of granules by slowly cooling the polymerization reaction system after the polymerization reaction. Therefore, these polymerization aids are called phase separation agents.

More specifically, when at least one sulfur source selected from the group consisting of alkali metal sulfides and alkali metal hydrosulfides is reacted with a dihalo-aromatic compound, a desalting condensation reaction between the monomers is caused to rapidly progress to increase the conversion of the dihalo-aromatic compound. However, the polymer in this state is low in melt viscosity (molecular weight) and is in a stage of the so-called prepolymer. When a phase-separated state that a concentrated formed polymer phase and a dilute formed polymer phase are present in a mixed state is created in a liquid phase within the polymerization reaction system in the presence of the phase separation agent, the concentrated formed polymer phase is dispersed in the dilute formed polymer phase by stirring, and a condensation reaction between the prepolymers is caused to efficiently progress in the concentrated phase. As a result, the formation of a high-molecular weight polymer is advanced.

In the granular, high-molecular weight PAS, impurities such as the secondarily formed alkali metal salt and oligomers are easily removed therefrom by washing. At present, the granular, high-molecular weight PAS is washed by a combination of water washing, washing with an organic solvent, acid washing, etc., whereby a PAS substantially containing no alkali metal salt such as NaCl comes to be obtained. The granular, high-molecular weight PAS sufficiently washed does substantially not produce ash even when it is burnt.

However, it is extremely difficult to reduce the content of the bonded halogen atom such as a chlorine atom bonded to a terminal even by the production process of the PAS comprising such a phase-separation polymerization step. On the other hand, the requirement of halogen-free regulation on the whole polymer product from environmental groups is heightened in addition to the requirement of halogen-free regulation on PASs from electronic part makers, and PAS makers bear the responsibility of satisfying these requirements.

By the way, Japanese Patent Publication No. 5-11128 (Patent Literature 10) discloses a process in which upon production of a PAS by reacting an alkali metal sulfide and a dihalo-aromatic compound in a polar organic solvent, a monohalo or polyhalo-substituted organic compound (however, excluding compounds, on the aromatic ring of which a halogen or halogens are directly substituted), is added to conduct the reaction. However, the process disclosed in Patent Literature 10 intends to raise the melt crystallization temperature of the resulting PAS, and does not intends to produce a PAS whose content of a terminal halogen group has been reduced.

Specifically, in the process disclosed in Examples of Patent Literature 10, the monohalo or polyhalo-substituted organic compound is only added into the polymerization reaction system at the beginning of a polymerization reaction or at the time final-stage polymerization (phase-separation polymerization) has been substantially completed. However, it is difficult to obtain a PAS whose content of a terminal halogen group has been reduced by such a process.

CITATION LIST

Patent Literature

Patent Literature 1: Japanese Patent Application Laid-Open No. 55-156342

Patent Literature 2: Japanese Patent Application Laid-Open No. 59-219331
Patent Literature 3: Japanese Patent Application Laid-Open No. 62-106929
Patent Literature 4: Japanese Patent Application Laid-Open No. 5-163349
Patent Literature 5: Japanese Patent Publication No. 52-12240
Patent Literature 6: Japanese Patent Application Laid-Open No. 59-219332
Patent Literature 7: U.S. Pat. No. 4,038,263
Patent Literature 8: Japanese Patent Application Laid-Open No. 1-161022
Patent Literature 9: Japanese Patent Publication No. 63-33775
Patent Literature 10: Japanese Patent Publication No. 5-11128

SUMMARY OF THE INVENTION

Technical Problem

It is an object of the present invention to provide a production process of a poly(arylene sulfide), by which a granular poly(arylene sulfide) whose content of a terminal halogen group has been markedly reduced can be efficiently obtained while retaining a yield, a melt viscosity, a molecular weight, etc. at a high level.

The present inventors have carried out an extensive investigation with a view toward achieving the above object. As a result, the present inventors have reached a process that is a production process of a poly(arylene sulfide) comprising a step of polymerizing a sulfur source and a dihalo-aromatic compound in an organic amide solvent, wherein the polymerization step comprises a phase-separation polymerization step that the polymerization reaction is continued in the presence of a phase separation agent in a phase-separated state that a concentrated formed polymer phase and a dilute formed polymer phase are present in a mixed state in a liquid phase within the polymerization reaction system, and that in said production process, a specific amount of a monohalo-organic compound is added into the polymerization reaction system at the time a conversion of the dihalo-aromatic compound has reached a specific range after initiation of the polymerization reaction and before the liquid phase becomes the phase-separated state to be reacted with a formed polymer, and the liquid phase within the polymerization reaction system is then converted to the phase-separated state to continue the polymerization reaction.

According to the production process of the present invention, a granular poly(arylene sulfide) whose content of a terminal halogen group has been markedly reduced can be efficiently obtained while retaining a yield, a melt viscosity, a molecular weight, etc. at a high level by the mere addition of a relatively simple step to the conventional phase-separation polymerization process. The present invention has been led to completion on the basis of these findings.

Solution to Problem

According to the present invention, there is provided a production process of a poly(arylene sulfide) whose content of a terminal halogen group has been reduced, comprising a step of polymerizing a sulfur source and a dihalo-aromatic compound in an organic amide solvent, said polymerization step comprising a phase-separation polymerization step that the polymerization reaction is continued in the presence of a phase separation agent in a phase-separated state that a concentrated formed polymer phase and a dilute formed polymer phase are present in a mixed state in a liquid phase within the polymerization reaction system, wherein (1) a monohalo-organic compound is added in a proportion of 0.005 to 20 mol per 100 mol of the charged sulfur source into the polymerization reaction system at the time a conversion of the dihalo-aromatic compound has reached 80 to 99% after initiation of the polymerization reaction and before the liquid phase becomes the phase-separated state to be reacted with a formed polymer, and then (2) the liquid phase within the polymerization reaction system is converted to the phase-separated state to continue the polymerization reaction.

According to the present invention, there is provided, as a preferred embodiment, the production process of the poly(arylene sulfide), in which the polymerization step is conducted through at least the following 3 steps:

(I) a first-stage polymerization step 1 of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer that a conversion of the dihalo-aromatic compound is 80 to 99%;

(II) a step 2 of adding the monohalo-organic compound in a proportion of 0.005 to 20 mol per 100 mol of the charged sulfur source into the polymerization reaction system to be reacted with the formed polymer; and (III) a second-stage polymerization step 3 of causing at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 10 mol per mol of the charged sulfur source and heating the polymerization reaction system to a temperature of 245 to 290° C., thereby converting the liquid phase within the polymerization reaction system to the phase-separated state to continue the polymerization reaction.

According to the present invention, there is provided, as another preferred embodiment, the production process of the poly(arylene sulfide), in which the polymerization step is conducted through at least the following 3 steps:

(1) a first-stage polymerization step 1 of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer that a conversion of the dihalo-aromatic compound is 80 to 99%;

(2) a step 2 of adding the monohalo-organic compound in a proportion of 0.005 to 20 mol per 100 mol of the charged sulfur source into the polymerization reaction system to be reacted with the formed polymer; and (3) a second-stage polymerization step 3 of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby converting the liquid phase within the polymerization reaction system to the phase-separated state to continue the polymerization reaction.

According to the present invention, there is provided, as a further preferred embodiment, the production process of the poly(arylene sulfide), in which the polymerization step is conducted through at least the following 5 steps:

(a) a dehydration step I of heating and reacting a mixture containing the organic amide solvent, an alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system;

(b) a charging step II of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source including the alkali metal hydrosulfide existing in the system after the dehydration as a sulfur source, and the number of moles of water becomes 0.02 to 2.0 mol per mol of the charged sulfur source;

(c) a first-stage polymerization step III of adding the dihalo-aromatic compound to the mixture to subject the charged sulfur source and the dihalo-aromatic compound to a polymerization reaction at a temperature of 170 to 270° C. in the organic amide solvent, thereby forming a polymer that a conversion of the dihalo-aromatic compound is 80 to 99%;

(d) a step IV of adding the monohalo-organic compound in a proportion of 0.005 to 20 mol per 100 mol of the charged sulfur source into the polymerization reaction system to be reacted with the formed polymer; and (e) a second-stage polymerization step V of causing at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 10 mol per mol of the charged sulfur source and heating the polymerization reaction system to a temperature of 245 to 290° C., thereby converting the liquid phase within the polymerization reaction system to the phase-separated state to continue the polymerization reaction.

According to the present invention, there is provided, as a still further preferred embodiment, the production process of the poly(arylene sulfide), in which the polymerization step is conducted through at least the following 5 steps:

(A) a dehydration step I of heating and reacting a mixture containing the organic amide solvent, an alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system;

(B) a charging step II of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source including the alkali metal hydrosulfide existing in the system after the dehydration as a sulfur source, and the number of moles of water becomes 0.02 to 2.0 mol per mol of the charged sulfur source;

(C) a first-stage polymerization step III of adding the dihalo-aromatic compound to the mixture to subject the charged sulfur source and the dihalo-aromatic compound to a polymerization reaction at a temperature of 170 to 270° C. in the organic amide solvent, thereby forming a polymer that a conversion of the dihalo-aromatic compound is 80 to 99%;

(D) a step IV of adding the monohalo-organic compound in a proportion of 0.005 to 20 mol per 100 mol of the charged sulfur source into the polymerization reaction system to be reacted with the formed polymer; and (E) a second-stage polymerization step V of controlling the amount of water in the polymerization reaction system so as to bring about a state that water exists in a proportion of from more than 2.0 mol to not more than 10 mol per mol of the charged sulfur source, and heating the polymerization reaction system to a temperature of 245 to 290° C., thereby converting the liquid phase within the polymerization reaction system to the phase-separated state to continue the polymerization reaction.

Advantageous Effects of Invention

According to the present invention, there can be provided a PAS whose content of a terminal halogen group has been markedly reduced can be efficiently obtained while retaining a yield, a melt viscosity, a molecular weight, etc. at a high level. The PAS according to the present invention can satisfy the requirements of halogen-free regulation from various fields can be utilized in a wide variety of fields such as electrical and electronic equipments and automotive equipments, including sealing compounds or covering materials for electronic parts.

DESCRIPTION OF EMBODIMENTS

1. Sulfur Source

In the present invention, at least one sulfur source selected from the group consisting of alkali metal sulfides and alkali metal hydrosulfides is used as a sulfur source. As examples of the alkali metal sulfides, may be mentioned lithium sulfide, sodium sulfide, potassium sulfide, rubidium sulfide, cesium sulfide and mixtures of two or more compounds thereof. As examples of the alkali metal hydrosulfides, may be mentioned lithium hydrosulfide, sodium hydrosulfide, potassium hydrosulfide, rubidium hydrosulfide, cesium hydrosulfide and mixtures of two or more compounds thereof.

The alkali metal sulfide may be used in any form of an anhydride, a hydrate and an aqueous solution. Among these, sodium sulfide and lithium sulfide are preferred in that they are industrially available on the cheap. The alkali metal sulfide is preferably used as an aqueous mixture (i.e., a mixture with water having fluidity) such as an aqueous solution from the viewpoints of processing operation, metering, etc.

The alkali metal hydrosulfide may be used in any form of an anhydride, a hydrate and an aqueous solution. Among these, sodium hydrosulfide and lithium hydrosulfide are preferred in that they are industrially available on the cheap. The alkali metal hydrosulfide is preferably used as an aqueous mixture (i.e., a mixture with water having fluidity) such as an aqueous solution from the viewpoints of processing operation, metering, etc.

In general, a small amount of an alkali metal hydrosulfide is secondarily produced in a production process of the alkali metal sulfide. A small amount of the alkali metal hydrosulfide may be contained in the alkali metal sulfide used in the present invention. In this case, the total molar quantity of the alkali metal sulfide and alkali metal hydrosulfide becomes a charged sulfur source after a dehydration step.

On the other hand, in general, a small amount of an alkali metal sulfide is secondarily produced in a production process of the alkali metal hydrosulfide. A small amount of the alkali metal sulfide may be contained in the alkali metal hydrosulfide used in the present invention. In this case, the total molar quantity of the alkali metal hydrosulfide and alkali metal sulfide becomes a charged sulfur source after a dehydration step. When the alkali metal sulfide and the alkali metal hydrosulfide are mixed and used in combination, a mixture of both naturally becomes a charged sulfur source.

When the sulfur source contains the alkali metal hydrosulfide, an alkali metal hydroxide is used in combination. Examples of the alkali metal hydroxide include lithium hydroxide, sodium hydroxide, potassium hydroxide, rubidium hydroxide, cesium hydroxide and mixtures of two or more compounds thereof. Among these, sodium hydroxide and lithium hydroxide are preferred in that they are industrially available on the cheap. The alkali metal hydroxide is preferably used as an aqueous mixture such as an aqueous solution.

In the production process according to the present invention, examples of water to be dehydrated in the dehydration step includes water of hydration, a water medium of an aqueous solution and water secondarily produced in a reaction of the alkali metal hydrosulfide with the alkali metal hydroxide.

2. Dihalo-Aromatic Compound

The dihalo-aromatic compound used in the present invention is a dihalogenated aromatic compound having 2 halogen atoms directly bonded to a aromatic ring. Specific examples of the dihalo-aromatic compound include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides and dihalodiphenyl ketones.

Here, the halogen atom means each atom of fluorine, chlorine, bromine and iodine, and 2 halogen atoms in the same dihalo-aromatic compound may be the same or different from each other. These dihalo-aromatic compounds may be used either singly or in any combination thereof.

The charged amount of the dihalo-aromatic compound is generally 0.90 to 1.50 mol, preferably 0.95 to 1.20 mol, more preferably 1.00 to 1.09 mol, particularly preferably 1.00 to 1.05 mol per mol of the sulfur source (alkali metal sulfide and/or alkali metal hydrosulfide) remaining in the system after a dehydration step. If the charged amount of the dihalo-aromatic compound is too small, a decomposition reaction is easy to occur. If the charged amount is too great, it is difficult to make the molecular weight of a formed polymer high.

3. Branching or Crosslinking Agent

In order to introduce a branched or crosslinked structure into a formed PAS, a polyhalo-compound (may not be always an aromatic compound), to which at least 3 halogen atoms are bonded, an active hydrogen-containing halogenated aromatic compound, a halogenated aromatic nitro compound or the like may also be used in combination. Preferable examples of the polyhalo-compound as a branching or crosslinking agent include trihalobenzenes.

4. Organic Amide Solvent

In the present invention, an organic amide solvent that is an aprotic polar organic solvent is used as a solvent for a dehydration reaction and a polymerization reaction. The organic amide solvent is preferably stable to an alkali at a high temperature.

Specific examples of the organic amide solvent include amide compounds such as N,N-dimethylformamide and N,N-dimethylacetamide; N-alkylcaprolactam compounds such as N-methyl-ε-caprolactam; N-alkylpyrrolidone compounds or N-cycloalkylpyrrolidone compounds such as N-methyl-2-pyrrolidone and N-cyclohexyl-2-pyrrolidone; N,N-dialkylimidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof.

Among these organic amide solvents, N-alkyl-pyrrolidone compounds, N-cycloalkylpyrrolidone compounds, N-alkylcaprolactam compounds and N,N-dialkylimidazolidinone compounds are preferred, and N-methyl-2-pyrrolidone, N-methyl-ε-caprolactam and 1,3-dialkyl-2-imidazolidinones are particularly preferably used.

The amount of the organic amide solvent used in the polymerization reaction in the present invention is generally within a range of from 0.1 to 10 kg per mol of the sulfur source.

5. Phase Separation Agent (Polymerization Aid)

In order to promote the polymerization reaction to obtain a PAS having a high polymerization degree in a short period of time, various kinds of phase separation agents (polymerization aids) may be used in the present invention. The phase separation agent is a compound that is dissolved in the organic amide solvent by itself or under the coexistence of a small amount of water and has a function of lowering the solubility of the PAS in the organic amide solvent. The phase separation agent itself is a compound that is not a solvent for PASs.

As the phase separation agent, may be used a compound generally publicly known as a polymerization aid or phase separation agent for PASs. Specific examples of the phase separation agent include water, organic carboxylic acid metal salts such as alkali metal carboxylates, organic sulfonic acid metal salts, alkali metal halides such as lithium halides, alkaline earth metal halides, aromatic carboxylic acid alkaline earth metal salts, phosphoric acid alkali metal salts, alcohols and paraffinic hydrocarbons. These phase separation agents may be used either singly or in any combination thereof. Among these, water and organic carboxylic acid metal salts are preferred because they are cheap, and water is particularly preferred.

The amount of the polymerization aid used varies with the kind of the compound used. However, it is generally within a range of from 0.01 to 10 mol per mol of the charged sulfur source. In the phase-separation polymerization step, it is preferable to cause water to exist as the phase separation agent in a proportion of from higher than 2.0 mol to not higher than 10.0 mol per mol of the charged sulfur source in the polymerization reaction system. Another phase separation agent such as the organic carboxylic acid metal salt than water is used within a range of preferably from 0.01 to 3 mol, more preferably from 0.02 to 2 mol, particularly preferably from 0.03 to 1 mol per mol of the charged sulfur source. Even when water is used as the phase separation agent, another phase separation agent may be used as a polymerization aid in combination from the view point of efficiently conducting the phase-separation polymerization.

6. Dehydration Step

A dehydration step is arranged as a preliminary step for a polymerization step to control the amount of water in the reaction system. The dehydration step is performed by a process comprising heating and reacting a mixture containing the organic amide solvent and the alkali metal sulfide, desirably, under an inert gas atmosphere and discharging water outside the system by distillation. When the alkali metal hydrosulfide is used as a sulfur source, the dehydration step is performed by a process comprising heating and reacting a mixture containing the alkali metal hydrosulfide and an alkali metal hydroxide and discharging water outside the system by distillation.

In the dehydration step, the dehydration is conducted until the content of water comprising water of hydration (water of crystallization), a water medium, secondarily produced water, etc. is lowered within a range of necessary amounts. In the dehydration step, the dehydration is conducted until the water content in the polymerization reaction system is reduced to generally 0.02 to 2.0 mol, preferably 0.05 to 2 mol, more preferably 0.5 to 2.0 mol per mol of the charged sulfur source. The sulfur source after the dehydration step is called "a charged sulfur source". When the water content has become too low in the dehydration step, water may be added prior to the polymerization step to regulate the water content to a desired value.

When the alkali metal hydrosulfide is used as the sulfur source, a mixture containing the organic amide solvent, the alkali metal hydrosulfide and an alkali metal hydroxide in a proportion of 0.95 to 1.05 mol per mol of the alkali metal hydrosulfide is preferably heated and reacted to discharge at least a part of a distillate containing water from the interior of the system containing the mixture to the exterior of the system.

If a molar ratio of the alkali metal hydroxide to a mole of the charged alkali metal hydrosulfide in this step is too low, the amount of a sulfur component (hydrogen sulfide) volatilized off in the dehydration step becomes great, which tends to incur reduction in productivity due to lowering of the amount of the charged sulfur source or cause abnormal reactions and deterioration of a PAS formed due to increase of a polysulfide component in the charged sulfur source remaining after the dehydration. If the molar ratio of the alkali metal hydroxide to a mole of the charged alkali metal hydrosulfide is too high, in some cases, change in properties of the organic amide solvent may be increased, difficulty may be encountered on stably performing the polymerization reaction, or the quality of a PAS formed may be deteriorated. A preferable molar ratio of the alkali metal hydroxide to a mole of the charged alkali metal hydrosulfide in this step is 1.00 to 1.04, more preferably 1.005 to 1.03.

In many cases, a small amount of an alkali metal sulfide is contained in an alkali metal hydrosulfide, so that the amount of the sulfur source involves a total of the alkali metal hydrosulfide and the alkali metal sulfide. No problem arises as to a raw material for the PAS even if the alkali metal hydrosulfide contains the alkali metal sulfide. However, the content thereof is preferably as low as possible for producing a high-quality PAS in the present invention. Even when a small amount of the alkali metal sulfide is mixed in, the molar ratio to the alkali metal hydroxide may be calculated out on the basis of the content (analytical value) of the alkali metal hydrosulfide in the present invention to regulate the molar ratio between them.

The charging of the respective raw materials into a reaction vessel in the dehydration step is conducted within a temperature range of generally from ordinary temperature (5 to 35° C.) to 300° C., preferably from ordinary temperature to 200°

C. The charging of the raw materials may not be in order, and the respective raw materials may be additionally charged in the course of the dehydration process. An organic amide solvent is used as a solvent used in the dehydration step. This solvent is preferably the same as the organic amide solvent used in the polymerization step, and N-methyl-2-pyrrolidone is particularly preferred. The amount of the organic amide solvent used is generally of the order of 0.1 to 10 kg per mol of the sulfur source charged in the reaction vessel.

The dehydration process is conducted by heating the mixture after charging the raw materials into the reaction vessel in a temperature range of generally up to 300° C., preferably 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system of both systems.

An apparatus for conducting the dehydration step may be the same as a reaction vessel (reactor) used in the subsequent polymerization step or different from it. A material of the apparatus is preferably a corrosion resistant material such as titanium. In the dehydration step, a part of the organic amide solvent is generally discharged together with water outside the reaction vessel. At that time, hydrogen sulfide is discharged as a gas outside the system.

7. Charging Step

In the present invention, an alkali metal hydroxide and water may be added to the mixture remaining in the system after the dehydration step as needed. When the alkali metal hydrosulfide is used as the sulfur source in particular, the mixture is preferably adjusted in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source (sulfur source) including the alkali metal hydrosulfide existing in the system after the dehydration as a sulfur source, and the number of moles of water becomes generally 0.02 to 2.0 mol, preferably 0.05 to 2.0 mol, more preferably 0.5 to 2.0 mol per mol of the charged sulfur source.

Here, the amount of the charged sulfur source is calculated out in accordance with an equation, [Charged sulfur source]=[Total moles of sulfur charged]−[Moles of sulfur volatilized off after dehydration].

When hydrogen sulfide is volatilized off in the dehydration step, an alkali metal hydroxide is produced by an equilibrium reaction and comes to remain in the system. Accordingly, it is necessary to exactly grasp the amount of hydrogen sulfide volatilized off to determine a molar ratio of the alkali metal hydroxide to the sulfur source in the charging step.

If the molar ratio of the alkali metal hydroxide to a mole of the charged sulfur source is too high, in some cases, change in properties of the organic amide solvent may be increased, or abnormal reactions or decomposition reactions may be caused upon polymerization. In addition, if this molar ratio is too high, the lowering of the yield and quality of a PAS formed is often caused. The molar ratio of the alkali metal hydroxide to a mole of the charged sulfur source is preferably 1.01 to 1.08 mol, more preferably 1.015 to 1.075 mol. It is preferred to conduct the polymerization reaction slightly in excess of the alkali metal hydroxide in that the polymerization reaction is stably performed to obtain a high-quality PAS.

8. Polymerization Step

The polymerization step is conducted by charging a dihalo-aromatic compound into the mixture after completion of the dehydration step and heating the sulfur source and the dihalo-aromatic compound in the organic amide solvent. When a polymerization vessel different from the reaction vessel used in the dehydration step is used, the mixture after the dehydration step and the dihalo-aromatic compound are charged into the polymerization vessel. After the dehydration step and before the polymerization step, the amounts of the organic amide solvent and coexisting water may be controlled as needed. Before the polymerization step or during the polymerization step, a polymerization aid and other additives may be mixed.

The mixing of the mixture obtained after completion of the dehydration step with the dihalo-aromatic compound is conducted within a temperature range of generally from 100 to 350° C., preferably from 120 to 330° C. When the respective components are charged into the polymerization vessel, no particular limitation is imposed on the order of charging, and the charging is conducted by a method of partially charging both components in small portions and a method of charging both components at a time.

In general, the polymerization reaction is preferably conducted by a two-stage process of a first-stage polymerization step and a second-stage polymerization step at a temperature ranging from 170 to 290° C. As a heating method, is used a method of retaining a fixed temperature, a method of raising the temperature either stepwise or continuously or a combination of both methods. The polymerization reaction time is within a range of generally from 10 minutes to 72 hours, desirably from 30 minutes to 48 hours. The amount of the organic amide solvent used in the polymerization step is within a range of generally from 0.1 to 10 kg, preferably from 0.15 to 5 kg per mol of the charged sulfur source existing in the polymerization step. The amount may be changed in the course of the polymerization reaction so far as it falls within this range.

The content of the coexisting water upon the beginning of the polymerization reaction is desirably controlled within a range of generally from 0.02 to 2.0 mol, preferably from 0.05 to 2.0 mol, more preferably from 0.5 to 2.0 mol per mol of the charged sulfur source. It is preferable to increase the content of the coexisting water in the course of the polymerization reaction.

In the production process according to the present invention, the polymerization reaction in the polymerization step is preferably conducted by a polymerization step comprising:

(1) a first-stage polymerization step of heating a reaction mixture containing the organic amide solvent, the sulfur source and the dihalo-aromatic compound to 170 to 270° C. in the presence of water in a proportion of 0.02 to 2.0 mol per mol of the charged sulfur source to conduct a polymerization reaction, thereby forming a polymer that a conversion of the dihalo-aromatic compound is 80 to 99%, and (2) a second-stage polymerization step of causing a phase separation agent to exist in an amount of 0.01 to 10 mol per mol of the charged sulfur source and heating the polymerization reaction system to a temperature of 245 to 290° C. to continue the polymerization reaction.

More specifically, in the production process according to the present invention, the polymerization step is preferably conducted through at least the following 3 steps:

(I) a first-stage polymerization step 1 of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer that a conversion of the dihalo-aromatic compound is 80 to 99%;

(II) a step 2 of adding the monohalo-organic compound in a proportion of 0.005 to 20 mol per 100 mol of the charged sulfur source into the polymerization reaction system to be reacted with the formed polymer; and (III) a second-stage polymerization step 3 of causing at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 10 mol per mol of the charged sulfur source and heating the polymerization reaction system to a temperature of 245 to 290° C., thereby converting a liquid phase within the polymerization reaction system to a phase-separated state to continue the polymerization reaction.

According to the present invention, the polymerization step is preferably conducted through at least the following 3 steps:

(1) a first-stage polymerization step 1 of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer that a conversion of the dihalo-aromatic compound is 80 to 99%;

(2) a step 2 of adding the monohalo-organic compound in a proportion of 0.005 to 20 mol per 100 mol of the charged sulfur source into the polymerization reaction system to be reacted with the formed polymer; and (3) a second-stage polymerization step 3 of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby converting the liquid phase within the polymerization reaction system to a phase-separated state to continue the polymerization reaction.

The amount of the coexisting water in the reaction system in the first-stage polymerization step is within a range of from 0.02 to 2.0 mol, preferably from 0.05 to 2.0 mol, more preferably from 0.5 to 2.0 mol, particularly preferably 1.0 to 1.9 mol per mol of the charged sulfur source. If the amount of the coexisting water is too small, unpreferable reactions such as decomposition of a PAS formed are easy to occur. If the amount of the coexisting water exceeds 2.0 mol on the other hand, a polymerization rate becomes markedly low, or decomposition of the organic amide solvent and a PAS formed is easy to occur. Thus, such a too small or great amount is not preferable. The polymerization is conducted within a temperature range of from 170 to 270° C., preferably from 180 to 265° C. If the polymerization temperature is too low, the polymerization rate becomes too slow. If the polymerization temperature is a high temperature exceeding 270° C. on the other hand, decomposition of a PAS formed and the organic amide solvent is easy to occur, and the polymerization degree of the PAS formed becomes extremely low.

When water is used as the phase separation agent in the second-stage polymerization step, it is preferable to control the amount of water in the polymerization reaction system so as to bring about a state that water exists in a proportion of from more than 2.0 mol to not more than 10 mol per mol of the charged sulfur source. If the amount of the coexisting water in the reaction system in the second-stage polymerization step is not more than 2.0 mol or more than 10 mol, the polymerization degree of a PAS formed is lowered. It is particularly preferable to conduct the second-stage polymerization in a state that the amount of the coexisting water falls within a range of from 2.2 to 7 mol because a PAS having a high polymerization degree is easy to be obtained. When another phase separation agent (at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons) than water is used as the phase separation agent in the second-stage polymerization step, the phase separation agent is preferably caused to exist within a range of from 0.01 to 3 mol per mol of the charged sulfur source.

If the polymerization temperature in the step 2 is lower than 245° C., a PAS having a high polymerization degree is difficult to be obtained. If the polymerization temperature exceeds 290° C., there is a possibility that a PAS formed and the organic amide solvent may be decomposed. In particular, a temperature range of from 250 to 270° C. is preferred because a PAS having a high polymerization degree is easy to be obtained. The second-stage polymerization step in the present invention is not the mere step of fractionating and granulating the PAS prepolymer formed in the first-stage polymerization step, but a step of increasing the polymerization degree of the PAS prepolymer.

Water is preferably used as the phase separation agent in the second-stage polymerization step. However, another phase separation agent (polymerization aid) may be used together with water within a range of from 0.01 to 3 mol per mol of the charged sulfur source. For example, it is preferable to control the amount of water in the polymerization reaction system in the second-stage polymerization step 3 so as to bring about a state that water exists in a proportion of from more than 2.0 mol to not more than 10 mol per mol of the charged sulfur source, and moreover to cause at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 3 mol per mol of the charged sulfur source.

When the alkali metal hydrosulfide is used as the sulfur source in the present invention, the polymerization reaction in the polymerization step is preferably conducted by a polymerization step comprising:

(1) a first-stage polymerization step of heating a reaction mixture containing the organic amide solvent, the sulfur source, the dihalo-aromatic compound and an alkali metal hydroxide at a specific molar ratio to 170 to 270° C. in the presence of water in a proportion of 0.02 to 2.0 mol per mol of the charged sulfur source to conduct a polymerization reaction, thereby forming a polymer that a conversion of the dihalo-aromatic compound is 80 to 99%, and (2) a second-stage polymerization step of causing a phase separation agent to exist in an amount of 0.01 to 10 mol per mol of the charged sulfur source and heating the polymerization reaction system to 245 to 290° C. to continue the polymerization reaction.

More specifically, when the alkali metal hydrosulfide is used as the sulfur source, the polymerization step is preferably conducted through at least the following 5 steps:

(a) a dehydration step I of heating and reacting a mixture containing the organic amide solvent, the alkali metal hydrosulfide and the alkali metal hydroxide in a proportion of 0.95 to 1.05 mol per mol of the alkali metal hydrosulfide to discharge at least a part of a distillate containing water from the interior of the system containing the mixture to the exterior of the system, (b) a charging step II of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source including the alkali metal hydrosulfide existing in the system after the dehydration as a sulfur source, and the number of moles of water becomes 0.02 to 2.0 mol per mol of the charged sulfur source, (c) a first-stage polymerization step III of adding the dihalo-aromatic compound to the mixture to subject the charged sulfur source and the dihalo-aromatic compound to a polymerization reaction at a temperature of 170 to 270° C. in the organic amide solvent, thereby forming a polymer that a conversion of the dihalo-aromatic compound is 80 to 99%;

(d) a step IV of adding the monohalo-organic compound in a proportion of 0.005 to 20 mol per 100 mol of the charged sulfur source into the polymerization reaction system to be reacted with the formed polymer; and (e) a second-stage polymerization step V of causing at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 10 mol per mol of the charged sulfur source and heating the polymerization reaction system to a temperature of 245 to 290° C., thereby converting a liquid phase within the polymerization reaction system to a phase-separated state to continue the polymerization reaction.

When the alkali metal hydrosulfide is used as the sulfur source in the present invention, the polymerization step is preferably conducted through at least the following 5 steps:

(A) a dehydration step I of heating and reacting a mixture containing the organic amide solvent, the alkali metal hydrosulfide and the alkali metal hydroxide in a proportion of 0.95 to 1.05 mol per mol of the alkali metal hydrosulfide to discharge at least a part of a distillate containing water from the interior of the system containing the mixture to the exterior of the system;

(B) a charging step II of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source including the alkali metal hydrosulfide existing in the system after the dehydration as a sulfur source, and the number of moles of water becomes 0.02 to 2.0 mol per mol of the charged sulfur source;

(C) a first-stage polymerization step III of adding the dihalo-aromatic compound to the mixture to subject the charged sulfur source and the dihalo-aromatic compound to a polymerization reaction at a temperature of 170 to 270° C. in the organic amide solvent, thereby forming a polymer that a conversion of the dihalo-aromatic compound is 80 to 99%;

(D) a step IV of adding the monohalo-organic compound in a proportion of 0.005 to 20 mol per 100 mol of the charged sulfur source into the polymerization reaction system to be reacted with the formed polymer; and (E) a second-stage polymerization step V of controlling the amount of water in the polymerization reaction system so as to bring about a state that water exists in a proportion of from more than 2.0 mol to not more than 10 mol per mol of the charged sulfur source, and heating the polymerization reaction system to a temperature of 245 to 290° C., thereby converting a liquid phase within the polymerization reaction system to a phase-separated state to continue the polymerization reaction.

In the respective first-stage polymerization steps, it is desirable to form a polymer (also referred to as "a prepolymer") having a melt viscosity of generally 0.5 to 30 Pa·s as measured at a temperature of 310° C. and a shear rate of 1,216 sec$^{-1}$.

Even when the alkali metal hydrosulfide is used as the sulfur source, water is preferably used as the phase separation agent in the second-stage polymerization step. However, another phase separation agent (polymerization aid) may be used together with water within a range of from 0.01 to 3 mol per mol of the charged sulfur source. For example, it is preferable to control the amount of water in the polymerization reaction system in the second-stage polymerization step so as to bring about a state that water exists in a proportion of from more than 2.0 mol to not more than 10 mol per mol of the charged sulfur source, and moreover to cause at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 3 mol per mol of the charged sulfur source.

Water may be added at a final stage of the polymerization reaction or upon completion thereof to increase the water content for the purpose of lowering the contents of common salt secondarily produced and impurities in the polymer formed or collecting the polymer in the form of granules. The system of the polymerization reaction may be a batch system, a continuous system or a combination of both systems. In the batch-wise polymerization, 2 or more reaction vessels may be used, if desired, for the purpose of shortening the polymerization cycle time.

9. Reaction with Monohalo-Organic Compound

In the present invention, a monohalo-organic compound is added in a proportion of 0.005 to 20 mol per 100 mol of the charged sulfur source into the polymerization reaction system at the time a conversion of the dihalo-aromatic compound has reached 80 to 99% after initiation of the polymerization reaction in such a polymerization step as described above and before the liquid phase becomes a phase-separated state to be reacted with a formed polymer. The liquid phase within the polymerization reaction system is then converted to the phase-separated state to continue the polymerization reaction.

The time the monohalo-organic compound is added is preferably at the time the conversion of the dihalo-aromatic compound has reached preferably 85 to 98%, more preferably 90 to 97%. The conversion of the dihalo-aromatic compound is a value calculated out in accordance with the following equation.

When the dihalo-aromatic compound (abbreviated as "DHA") is added in excess in terms of a molar ratio to the sulfur source, the conversion is calculated out in accordance with the following equation:

Conversion=[(Charged amount(mol)of DHA)−(Remaining amount(mol)of DHA)]/[(Charged amount(mol)of DHA)−(Excessive amount(mol) of DHA)]×100.

In other case, the conversion is calculated out in accordance with the following equation:

Conversion=[(Charged amount(mol)of DHA)−(Remaining amount(mol)of DHA)]/[(Charged amount(mol)of DHA)]×100.

Examples of the monohalo-organic compound includes monohalo-substituted saturated or unsaturated aliphatic hydrocarbons such as monohalopropanes, monohalobutanes, monohaloheptanes, monohalohexanes, aryl halides and chloroprene; monohalo-substituted saturated cyclic hydrocarbons such as monohalocyclohexanes and monohalodecalins; and monohalo-substituted aromatic hydrocarbons such as monohalobenzenes, monohalonaphthalenes, 4-chlorobenzoic acid, methyl 4-chlorobenzoate, 4-chlorodiphenyl sulfone, 4-chlorobenzonitrile, 4-chlorobenzotrifluoride, 4-chloronitrobenzene, 4-chloroacetophenone, 4-chlorobenzophenone and benzyl chloride. These monohalo-organic compounds may be used either singly or in any combination thereof.

The halogen atom means each of fluorine, chlorine, bromine and iodine atoms. Among these halogen atoms, the chlorine atom is preferred. Even an organic compound, on which a chlorine atom has been substituted and which has a substituent such as trifluoromethane extremely low in reactivity compared with the chlorine atom, is included in the monohalo-organic compounds for the sake of convenience.

Among these monohalo-organic compounds, aromatic compounds having a monohalo-substituted aliphatic hydrocarbon group such as a monochloromethane group; and monohalo-substituted aromatic compounds having an electron-withdrawing group such as a carboxyl group, methoxycarbonyl group, sulfonic group, cyano group, nitro group, carbonyl group or ether group are preferred, with benzyl chloride being particular preferred.

The monohalo-organic compound is added into the polymerization reaction system at the time a conversion of the dihalo-aromatic compound has reached 80 to 99%, preferably 85 to 98%, more preferably 90 to 97% after initiation of the polymerization reaction and before a liquid phase within the polymerization reaction system becomes a phase-separated state. The monohalo-organic compound is added in a proportion of 0.005 to 20 mol, preferably 0.1 to 10 mol, more preferably 0.2 to 5 mol per mol of the charged sulfur source to be reacted with the polymer (prepolymer) formed.

The reaction of the monohalo-organic compound with the formed polymer is conducted at a temperature of 170 to 270° C., preferably 200 to 250° C., more preferably 210 to 240° C. within a time range of generally from 1 to 60 minutes, preferably from 3 to 45 minutes, more preferably from 5 to 30 minutes, often from 7 to 20 minutes.

Thereafter, the polymerization reaction is continued in the presence of the phase separation agent in a phase-separated state that a concentrated formed polymer phase and a dilute formed polymer phase are present in a mixed state in the liquid phase within the polymerization reaction system. The concentration of PAS in the concentrated phase is generally 30 to 70% by mass, preferably 40 to 60% by mass, more preferably 45 to 55% by mass. The concentration of PAS in the dilute phase is generally 0 to 10% by mass, preferably 0 to 8% by mass, more preferably 0 to 5% by mass.

When the phase-separated state that the concentrated formed polymer phase and the dilute formed polymer phase are present in a mixed state is created in the liquid phase within the polymerization reaction system in the presence of the phase separation agent as described above, the concentrated formed polymer phase is dispersed in the dilute formed polymer phase by stirring, and a condensation reaction between the prepolymers is caused to efficiently progress in the concentrated phase. As a result, the formation of a high-molecular weight polymer is advanced.

When water is used as the phase separation agent, it is preferable to adopt such a two-stage polymerization process as described above. Specific processes are the following production processes among the above-described production processes.

The first production process is a production process, in which the polymerization step is conducted through at least the following 3 steps:

(1) a first-stage polymerization step 1 of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer that a conversion of the dihalo-aromatic compound is 80 to 99%;

(2) a step 2 of adding the monohalo-organic compound in a proportion of 0.005 to 20 mol per 100 mol of the charged sulfur source into the polymerization reaction system to be reacted with the formed polymer; and (3) a second-stage polymerization step 3 of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby converting the liquid phase within the polymerization reaction system to the phase-separated state to continue the polymerization reaction.

In the second-stage polymerization step, water is used as the phase separation agent. However, another phase separation agent (polymerization aid) may be used together with water within a range of from 0.01 to 3 mol per mol of the charged sulfur source. When water is used as the phase separation agent, water is preferably caused to exist in a proportion of 0.5 to 2.0 mol per mol of the charged sulfur source in the first-stage polymerization step.

The second production process is a production process in case where an alkali metal hydrosulfide is used as the sulfur source, in which the polymerization step is conducted through at least the following 5 steps:

(A) a dehydration step I of heating and reacting a mixture containing the organic amide solvent, the alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system;

(B) a charging step II of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source (sulfur source) including the alkali metal hydrosulfide existing in the system after the dehydration as a sulfur source, and the number of moles of water becomes 0.02 to 2.0 mol per mol of the charged sulfur source;

(C) a first-stage polymerization step III of adding the dihalo-aromatic compound to the mixture to subject the charged sulfur source and the dihalo-aromatic compound to a polymerization reaction at a temperature of 170 to 270° C. in the organic amide solvent, thereby forming a polymer that a conversion of the dihalo-aromatic compound is 80 to 99%;

(D) a step IV of adding the monohalo-organic compound in a proportion of 0.005 to 20 mol per 100 mol of the charged sulfur source into the polymerization reaction system to be reacted with the formed polymer; and (E) a second-stage polymerization step V of controlling the amount of water in the polymerization reaction system so as to bring about a state that water exists in a proportion of from more than 2.0 mol to not more than 10 mol per mol of the charged sulfur source, and heating the polymerization reaction system to a temperature of 245 to 290° C., thereby converting the liquid phase within the polymerization reaction system to the phase-separated state to continue the polymerization reaction.

No phase-separated state appears in the first-stage polymerization step. In the second-stage polymerization step in which water has been added, the liquid phase within the polymerization reaction system is phase-separated into a concentrated polymer phase high in the content of the polymer (prepolymer) formed in the first-stage polymerization and a dilute polymer phase low in the content of the polymer. The phase-separated state can be visually clearly observed.

In the second-stage polymerization step, water is used as the phase separation agent. However, another phase separation agent (polymerization aid) may be used together with water within a range of from 0.01 to 3 mol per mol of the charged sulfur source. When water is used as the phase separation agent, water is preferably caused to exist in a proportion of 0.5 to 2.0 mol per mol of the charged sulfur source in the first-stage polymerization step.

If the monohalo-organic compound is added in an initial stage of the polymerization reaction, for example, in the charging step, the molecular weight of a PAS formed becomes low (low in melt viscosity), and it is thus difficult to provide a high-molecular weight PAS. Even if the monohalo-organic compound is added at the time the liquid phase is in the phase-separated state, for example, at an initial stage or final stage of the phase-separation polymerization step, the content of the terminal halogen group cannot be reduced, or the degree of reduction becomes insufficient.

10. Post Treatment Step

In the production process according to the present invention, a post treatment after the polymerization reaction may be conducted in accordance with a method known per se in the art. For example, after completion of the polymerization reaction, a product slurry cooled is separated by filtration as it is or after diluted with water or the like, and the resulting filter cake is washed and filtered repeatedly and then dried, whereby a PAS can be collected. The washing is preferably conducted by a suitable combination of water washing, washing with an organic solvent, acid washing, etc. until a secondarily formed alkali metal salt and oligomers are removed.

According to the production process of the present invention, a granular polymer can be formed, so that a method of separating the granular PAS from the reaction mixture by a method of sieving the polymer by means of a screen is preferably adopted because the polymer can be easily separated from by-products, oligomers, etc. The product slurry may be subjected to sieving as it is in a high-temperature state, thereby collecting the polymer.

After the filtration (sieving), the PAS is preferably washed with the same organic amide solvent as the polymerization solvent, or an organic solvent such as a ketone (for example, acetone) or an alcohol (for example, methanol). The PAS may be washed with hot water or the like. The formed PAS may also be treated with an acid or a salt such as ammonium chloride.

11. Poly(Arylene Sulfide)

According to the production process of the present invention, a PAS whose content of a terminal halogen group (generally, terminal chloride atom) has been markedly reduced can be obtained. The content of the terminal halogen group is generally 3,000 ppm or less, preferably 2,800 ppm or less, more preferably 2,500 ppm or less. The kind and amount of the monohalo-organic compound added are adjusted, whereby the content of the terminal halogen group can be reduced to 2,000 ppm or less, further to 1,500 ppm or less.

According to the production process of the present invention, the melt viscosity and weight-average molecular weight of the resulting PAS can be retained at a high level compared with the conventional production processes. According to the production process of the present invention, a PAS having a melt viscosity of generally 1 to 100 Pa·s, preferably 5 to 85 Pa·s, particularly preferably 6 to 70 Pa·s as measured at a temperature of 310° C. and a shear rate of 1,216 sec$^{-1}$ can be provided. According to the production process of the present invention, a PAS having a weight-average molecular weight of generally 10,000 to 60,000, preferably 13,000 to 55,000, particularly preferably 14,000 to 50,000 can be provided.

According to the production process of the present invention, a granular polymer captured on a screen having a sieve opening size of 150 μm (100 mesh) can be collected at a yield of generally 80 to 98%, preferably 83 to 97%, particularly preferably 85 to 95%. The kind and amount of the monohalo-organic compound added are adjusted in the production process according to the present invention, whereby the average particle diameter of the resulting polymer can be increased to preferably 1.1 to 5 times, more preferably 1.2 to 3 times, particularly preferably 1.3 to 2.5 times compared with the conventional production processes.

The PAS obtained by the production process according to the present invention may be molded or formed into various injection-molded products or extruded products such as sheets, films, fibers and pipes either singly or by incorporating various kinds of inorganic fillers, fibrous fillers and/or various kinds of synthetic resins as it is or after subjected to oxidative crosslinking. The PAS is particularly preferably PPS.

EXAMPLES

The present invention will hereinafter be described more specifically by the following Examples and Comparative Examples. However, the present invention is not limited to these examples alone. Measuring methods of physical properties and properties or characteristics in the present invention are as follows.

(1) Yield of Granular Polymer

After completion of a polymerization reaction, the reaction mixture was sifted through a plurality of screens different in sieve opening size and then fractionated and washed. A polymer captured on a screen having a sieve opening size of 150 μm (100 mesh) was regarded as "a granular polymer". Assuming that all the available sulfur component in a charged sulfur source existing in a reaction vessel after a dehydration step was converted to a polymer, the yield of the granular polymer was based on the mass (theoretical amount) of that polymer. When the available sulfur source is charged in excess in terms of a molar ratio to the dihalo-aromatic compound, all the available sulfur source cannot be converted to a polymer. Even in that case, the yield is calculated out on the basis of the amount of the available sulfur source for the present.

(2) Particle Diameter of Polymer

The average particle diameter of a granular polymer collected was measured by a sifting method using sieves of mesh #7 (sieve opening size: 2,800 μm), mesh #12 (sieve opening size: 1,410 μm), mesh #16 (sieve opening size: 1000 μm), mesh #24 (sieve opening size: 710 μm), mesh #32 (sieve opening size: 500 μm), mesh #60 (sieve opening size: 250 μm), mesh #100 (sieve opening size: 150 μm), mesh #145 (sieve opening size: 105 μm) and mesh #200 (sieve opening size: 75 μm) as sieves used.

(3) Content of Halogen

A polymer sample, from which a secondarily produced alkali metal salt (NaCl) had been substantially removed by washing, was used to measure a content of a halogen (chlorine) by the flask combustion method.

(4) Weight-Average Molecular Weight

The weight-average molecular weight (Mw) of a polymer was measured under the following conditions by using a high-temperature gel permeation chromatograph (GPC) SSC-7000 manufactured by Senshu Scientific Co., Ltd. The weight-average molecular weight was calculated out as a value converted from polystyrene.
Solvent: 1-chloronaphthalene,
Temperature: 210° C.,
Detector: UV detector (360 nm),
Amount of sample poured: 200 μl (concentration: 0.05% by mass),
Flow rate: 0.7 ml/min, and
Standard polystyrene: 5 standard polystyrenes of 616,000, 113,000, 26,000, 8,200 and 600.

(5) Melt Viscosity

A melt viscosity was measured by using about 20 g of a dry granular polymer by means of Capirograph 1-C (trademark) manufactured by Toyo Seiki Seisakusho, Ltd.). A flat die of 1 mm in diameter×10 mm in length was used as a capillary, and the temperature was set to 310° C. After the polymer sample was introduced into the apparatus and held for 5 minutes, the melt viscosity was measured at a shear rate of 1,216 sec$^{-1}$.

Comparative Example 1

A 20-liter autoclave was charged with 6,004 g of N-methyl-2-pyrrolidone (hereinafter abbreviated as "NMP"), 1,999 g of sodium hydrosulfide (NaSH; purity: 61% by mass, containing 28 g of $Na_2S$) and 1,191 of sodium hydroxide (NaOH; purity: 74% by mass). A molar ratio of sodium hydroxide/sulfur source (NaOH/S) was 0.997, and a molar ratio of NaOH/NaSH was 1.013.

After the interior of the autoclave was purged with nitrogen gas, the contents were gradually heated to 200° C. over about 4 hours with stirring to distill off 1,006 g of water ($H_2O$), 1,287 g of NMP and 12 g of hydrogen sulfide ($H_2S$).

After the dehydration step, the contents in the autoclave were cooled to 150° C., and 3,350 g of p-dichlorobenzene (hereinafter abbreviated as "pDCB"), 3,456 g of NMP and 149 g of water were added. A ratio (g/mol) of NMP/charged sulfur source (hereinafter abbreviated as "charged S") in the autoclave was 376, a ratio (mol/mol) of pDCB/charged S was 1.05, a ratio (mol/mol) of $H_2O$/charged S was 1.52, and a ratio (mol/mol) of NaOH/charged S was 1.05.

While stirring the contents in the autoclave at 250 rpm by a stirrer, a reaction was conducted at 220° C. for 3 hours to conduct first-stage polymerization. A conversion into a polymer was 93%.

Thereafter, the number of revolutions of the stirrer was increased to 400 rpm, and 444 g of water was charged under pressure while continuing the stirring. A ratio (mol/mol) of $H_2O$/charged S was 2.65. The contents in the autoclave were heated to 255° C. and reacted for 4 hours to conduct second-stage polymerization.

After completion of the second-stage polymerization, the contents were cooled near to room temperature and then sifted through a 100-mesh screen to collect a granular polymer. The granular polymer was washed 3 times with acetone, 3 times with water, once with an aqueous solution of acetic acid adjusted to a pH of 4 and then additionally 4 times with water to obtain a washed granular polymer. The granular polymer was dried for 24 hours at a temperature of 100° C. in a thermostatic chamber. The yield of the granular polymer thus obtained was 82%, and the polymer had an average particle diameter of 350 μm, a melt viscosity of 35 Pa·s and a weight-average molecular weight Mw of 45,000. The results are shown in Table 1.

Example 1

A 20-liter autoclave was charged with 6,004 g of NMP, 1,999 g of sodium hydrosulfide and 1,191 of sodium hydroxide like Comparative Example 1. After purged with nitrogen gas, the contents were gradually heated to 200° C. over about 4 hours with stirring to distill off 1,006 g of water, 1,287 g of NMP and 12 g of hydrogen sulfide.

After the dehydration step, the contents were cooled to 150° C., 3,236 g of pDCB, 3,456 g of NMP and 149 g of water were added. While stirring the contents at 250 rpm by a stirrer, a reaction was conducted at 220° C. for 3 hours to conduct first-stage polymerization. A conversion into a polymer was 93%. Incidentally, the amount of PDCB was controlled in such a manner that the melt viscosity of the resulting polymer is almost the same as in the polymer of Comparative Example 1.

Then, 83 g (0.66 mol) of benzyl chloride was charged under pressure to conduct a reaction at 220° C. for 10 minutes.

Thereafter, the number of revolutions of the stirrer was increased to 400 rpm, and 444 g of water was charged under pressure while continuing the stirring. The contents in the autoclave were heated to 255° C. and reacted for 4 hours to conduct second-stage polymerization.

After completion of the second-stage polymerization, the contents were cooled near to room temperature and then sifted through a 100-mesh screen to collect a granular polymer. The granular polymer was washed 3 times with acetone, 3 times with water, once with an aqueous solution of acetic acid adjusted to a pH of 4 and then additionally 4 times with water to obtain a washed granular polymer. The granular polymer was dried for 24 hours at a temperature of 100° C. in a thermostatic chamber. The yield of the granular polymer thus obtained was 90%, and the polymer had an average particle diameter of 790 μm, a melt viscosity of 37 Pa·s and a Mw of 48,100. The results are shown in Table 1.

Examples 2 to 10

An operation was conducted in the same manner as in Example 1 except that after the first-stage polymerization and before the second-stage polymerization, 102 g (0.65 mol) of 4-chlorobenzoic acid (Example 2), 112 g (0.65 mol) of methyl 4-chlorobenzoate (Example 3), 165 g (0.65 mol) of 4-chlorodiphenyl sulfone (Example 4), 90 g (0.65 mol) of 4-chlorobenzonitrile (Example 5), 117 g (0.65 mol) of 4-chlorobenzotrifluoride (Example 6), 103 g (0.65 mol) of 4-chloro-nitrobenzene (Example 7), 101 g (0.65 mol) of 4-chloroacetophenone (Example 8), 142 g (0.65 mol) of 4-chlorobenzophenone (Example 9) or 24 g (0.11 mol) of 4-chlorobenzophenone (Example 10) was charged under pressure in place of benzyl chloride in Example 1, thereby obtaining respective granular polymers. The results are shown in Table 1.

Comparative Example 2

Polymerization was conducted in the same manner as in Example 9 except that 142 g (0.65 mol) of 4-chlorobenzophenone was added to the autoclave at the same time as pDCB before the first-stage polymerization in place of adding the said compound in the same amount after completion of the first-stage polymerization in Example 9, and an operation was conducted in the same manner as in Example 9 to obtain a granular polymer. The results are shown in Table 1.

Comparative Example 3

Polymerization was conducted in the same manner as in Example 9 except that 142 g (0.65 mol) of 4-chlorobenzophenone was charged under pressure at the beginning (after 30 minutes from the initiation of the second-stage polymerization) of the second-stage polymerization in place of adding the said compound in the same amount after completion of the first-stage polymerization in Example 9, and an operation was conducted in the same manner as in Example 9 to obtain a granular polymer. The results are shown in Table 1.

Comparative Example 4

Polymerization was conducted in the same manner as in Example 9 except that 142 g (0.65 mol) of 4-chlorobenzophenone was charged under pressure upon completion (after the reaction for 4 hours at 255° C.) of the second-stage polymerization and reacted for 10 minutes in place of adding the said compound in the same amount after completion of the first-stage polymerization in Example 9, and an operation was conducted in the same manner as in Example 9 to obtain a granular polymer. The results are shown in Table 1.

TABLE 1

| | Monohalo-organic compound | | | Polymer | | | | |
|---|---|---|---|---|---|---|---|---|
| | Kind | Monohalo/ charged S mol/mol | Time added | Cl content ppm | M.V. Pa·s | Mw | Yield % | Particle diameter μm |
| Ex. 1 | Benzyl chloride | 3/100 | First-stage polymerization Conversion: 93% | 1100 | 37 | 48100 | 90 | 790 |
| Ex. 2 | 4-Chlorobenzoic acid | 3/100 | First-stage polymerization Conversion: 93% | 1700 | 27 | 42700 | 85 | 800 |
| Ex. 3 | Methyl 4-chlorobenzoate | 3/100 | First-stage polymerization Conversion: 93% | 1800 | 20 | 32500 | 87 | 650 |
| Ex. 4 | 4-Chlorodiphenyl sulfone | 3/100 | First-stage polymerization Conversion: 93% | 2300 | 31 | 35000 | 86 | 680 |
| Ex. 5 | 4-Chlorobenzonitrile | 3/100 | First-stage polymerization Conversion: 93% | 2000 | 9 | 19500 | 85 | 500 |
| Ex. 6 | 4-Chlorobenzotrifluoride | 3/100 | First-stage polymerization Conversion: 93% | 1400 | 7 | 19000 | 85 | 450 |
| Ex. 7 | 4-Chloronitrobenzene | 3/100 | First-stage polymerization Conversion: 93% | 2300 | 9 | 20000 | 85 | 580 |
| Ex. 8 | 4-Chloroacetophenone | 3/100 | First-stage polymerization Conversion: 93% | 1700 | 7 | 19800 | 86 | 610 |
| Ex. 9 | 4-Chlorobenzophenone | 3/100 | First-stage polymerization Conversion: 93% | 2100 | 8 | 20800 | 91 | 450 |
| Ex. 10 | 4-Chlorobenzophenone | 0.5/100 | First-stage polymerization Conversion: 93% | 1500 | 83 | 57000 | 85 | 780 |
| Comp. EX.. 1 | None | — | — | 3300 | 35 | 45000 | 82 | 350 |
| Comp. Ex.. 2 | 4-Chlorobenzophenone | 3/100 | Before polymerization Conversion: 0% | 2500 | 4 | 15000 | 55 | 280 |
| Comp. Ex.. 3 | 4-Chlorobenzophenone | 3/100 | After 30 minutes of second-stage polymerization | 3500 | 18 | 28500 | 80 | 650 |
| Comp. Ex.. 4 | 4-Chlorobenzophenone | 3/100 | After 4 hours of second-stage polymerization | 4000 | 20 | 32000 | 82 | 350 |

INDUSTRIAL APPLICABILITY

The poly(arylene sulfides) according to the present invention can be suitably utilized in a wide variety of fields such as electrical and electronic equipments and automotive equipments, including sealing compounds or covering materials for electronic parts.

The invention claimed is:
1. A production process of a poly(arylene sulfide) whose content of a terminal halogen group has been reduced, comprising a step of polymerizing a sulfur source and a dihaloaromatic compound in an organic amide solvent, said polymerization step comprising a phase-separation polymerization step in which the polymerization reaction is continued in the presence of a phase separation agent in a phase-separated state wherein a concentrated formed poly- mer phase and a dilute formed polymer phase are present in a mixed state in a liquid phase within the polymerization reaction system, wherein (1) a monohalo-organic compound is added in a proportion of 0.005 to 20 mol per 100 mol of the charged sulfur source into the polymerization reaction system at the time when a conversion of the dihalo-aromatic compound has reached 80 to 99% after initiation of the polymerization reaction and before the liquid phase becomes the phase-separated state, to be reacted with a formed polymer, wherein the monohalo-organic compound is at least one monohalo-organic compound selected from the group consisting of monohalo-substituted saturated aliphatic hydrocarbons, monohalo-substituted unsaturated aliphatic hydrocarbons, monohalo-substituted saturated cyclic hydrocarbons, and monohalo-substituted aromatic hydrocarbons, and then (2) the liquid phase within the polymerization reaction system is converted to the phase-separated state to continue the polymerization reaction, wherein a high-molecular weight granular poly(arylene sulfide) are obtained at a high yield while retaining a melt viscosity at a high level.

2. The production process according to claim 1, wherein the monohalo-organic compound is an aromatic compound having a monohalo-substituted aliphatic hydrocarbon group or a monohalo-substituted aromatic compound having an electron-withdrawing group selected from the group consisting of a carboxyl group, a methoxycarbonyl group, a sulfonic group, a cyano group, a nitro group, a carbonyl group and an ether group.

3. The production process according to claim 1, wherein the reaction of the monohalo-organic compound with the formed polymer is conducted at a temperature ranging from 170 to 270° C. within a time range of from 1 to 60 minutes.

4. The production process according to claim 1, wherein in the step (2), at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons is added within a range of from 0.01 to 10 mol per mol of the charged sulfur source into the polymerization reaction system, thereby converting the liquid phase within the polymerization reaction system to the phase-separated state.

5. The production process according to claim 1, wherein in the step (2), the polymerization reaction is continued in a phase-separated state such that a concentrated formed polymer phase containing the poly(arylene sulfide) at a concentration of 30 to 70% by mass and a dilute formed polymer phase containing the poly(arylene sulfide) at a concentration of 0 to 10% by mass are present in a mixed state.

6. The production process according to claim 5, wherein in the step (2), the concentrated formed polymer phase is dispersed in the dilute formed polymer phase by stirring to continue the polymerization reaction.

7. The production process according to claim 1, wherein the polymerization step is conducted through at least the following 3 steps:

(I) a first-stage polymerization step 1 of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer such that a conversion of the dihalo-aromatic compound is 80 to 99%;

(II) a step 2 of adding the monohalo-organic compound in a proportion of 0.005 to 20 mol per 100 mol of the charged sulfur source into the polymerization reaction system to be reacted with the formed polymer; and (III) a second-stage polymerization step 3 of causing at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 10 mol per mol of the charged sulfur source and heating the polymerization reaction system to a temperature of 245 to 290° C., thereby converting the liquid phase within the polymerization reaction system to the phase-separated state to continue the polymerization reaction.

8. The production process according to claim 1, wherein the polymerization step is conducted through at least the following 3 steps:

(1) a first-stage polymerization step 1 of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer such that a conversion of the dihalo-aromatic compound is 80 to 99%;

(2) a step 2 of adding the monohalo-organic compound in a proportion of 0.005 to 20 mol per 100 mol of the charged sulfur source into the polymerization reaction system to be reacted with the formed polymer; and (3) a second-stage polymerization step 3 of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby converting the liquid phase within the polymerization reaction system to the phase-separated state to continue the polymerization reaction.

9. The production process according to claim 8, wherein in the second-stage polymerization step 3, the amount of water in the polymerization reaction system is controlled so as to bring about a state that water exists in a proportion of from more than 2.0 mol to not more than 10 mol per mol of the charged sulfur source, and at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons is caused to exist within a range of from 0.01 to 3 mol per mol of the charged sulfur source.

10. The production process according to claim 1, wherein the polymerization step is conducted through at least the following 5 steps:

(a) a dehydration step I of heating and reacting a mixture containing the organic amide solvent, an alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system;

(b) a charging step II of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source including the alkali metal hydrosulfide existing in the system after the dehydration as a sulfur source, and the number of moles of water becomes 0.02 to 2.0 mol per mol of the charged sulfur source;

(c) a first-stage polymerization step III of adding the dihalo-aromatic compound to the mixture to subject the charged sulfur source and the dihalo-aromatic compound to a polymerization reaction at a temperature of 170 to 270° C. in the organic amide solvent, thereby forming a polymer such that a conversion of the dihalo-aromatic compound is 80 to 99%;

(d) a step IV of adding the monohalo-organic compound in a proportion of 0.005 to 20 mol per 100 mol of the charged sulfur source into the polymerization reaction system to be reacted with the formed polymer; and (e) a second-stage polymerization step V of causing at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 10 mol per mol of the charged sulfur source and heating the polymerization reaction system to a temperature of 245 to 290° C., thereby converting the liquid phase within the polymerization reaction system to the phase-separated state to continue the polymerization reaction.

11. The production process according to claim 1, wherein the polymerization step is conducted through at least the following 5 steps:

(A) a dehydration step I of heating and reacting a mixture containing the organic amide solvent, an alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system;

(B) a charging step II of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source including the alkali metal hydrosulfide existing in the system after the dehydration as a sulfur source, and the number of moles of water becomes 0.02 to 2.0 mol per mol of the charged sulfur source;

(C) a first-stage polymerization step III of adding the dihalo-aromatic compound to the mixture to subject the charged sulfur source and the dihalo-aromatic compound to a polymerization reaction at a temperature of 170 to 270° C. in the organic amide solvent, thereby forming a polymer such that a conversion of the dihalo-aromatic compound is 80 to 99%;

(D) a step IV of adding the monohalo-organic compound in a proportion of 0.005 to 20 mol per 100 mol of the charged sulfur source into the polymerization reaction system to be reacted with the formed polymer; and (E) a second-stage polymerization step V of controlling the amount of water in the polymerization reaction system so as to bring about a state that water exists in a proportion of from more than 2.0 mol to not more than 10 mol per mol of the charged sulfur source, and heating the polymerization reaction system to a temperature of 245 to 290° C., thereby converting the liquid phase within the polymerization reaction system to the phase-separated state to continue the polymerization reaction.

12. The production process according to claim 11, wherein in the second-stage polymerization step V, the amount of water in the polymerization reaction system is controlled so as to bring about a state that water exists in a proportion of from more than 2.0 mol to not more than 10 mol per mol of the charged sulfur source, and at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons is caused to exist within a range of from 0.01 to 3 mol per mol of the charged sulfur source.

* * * * *